United States Patent [19]
Lambiris

[11] 3,868,923
[45] Mar. 4, 1975

[54] GEARSHIFT INDICATOR ARRANGEMENT

[75] Inventor: Theodore Lambiris, West Bloomfield, Mich.

[73] Assignee: General Motors Corporation, Detroit, Mich.

[22] Filed: Oct. 23, 1973

[21] Appl. No.: 408,805

[52] U.S. Cl.......... 116/124 R, 116/129 L, 350/96 B
[51] Int. Cl. ......................................... G09f 9/00
[58] Field of Search .................... 116/124 R, 129 L;
        240/1 EL, 10.1; 200/61.54, 61.85, 61.88;
        74/475; 350/96, 96 B; 353/97; 40/130 K, 2.1;
        340/380

[56] References Cited
UNITED STATES PATENTS

| | | |
|---|---|---|
| 2,561,508 | 7/1951 | Gregorie et al................. 240/2.1 X |
| 2,672,116 | 3/1954 | Gunderson...................... 116/124 R |
| 3,643,622 | 2/1972 | Cryer.............................. 116/124 R |
| 3,677,619 | 7/1972 | Mackenzie...................... 116/129 L |

Primary Examiner—Richard C. Queisser
Assistant Examiner—Denis E. Corr
Attorney, Agent, or Firm—John P. Moran

[57] ABSTRACT

A gearshift indicator arrangement including an instrument panel-mounted display dial with suitable indicia formed thereon, and a plurality of fiber optic bundles for transmitting light from a steering column-mounted light source to the display dial, with the light concentration observed at the speed ratio indicia and throughout the areas intermediate adjacent indicia, respectively, being alternately strong and weak, i.e., of predetermined different intensities, as determined by the quantities of fiber optic tubes in alternate bundles.

5 Claims, 5 Drawing Figures

PATENTED MAR 4 1975  3,868,923
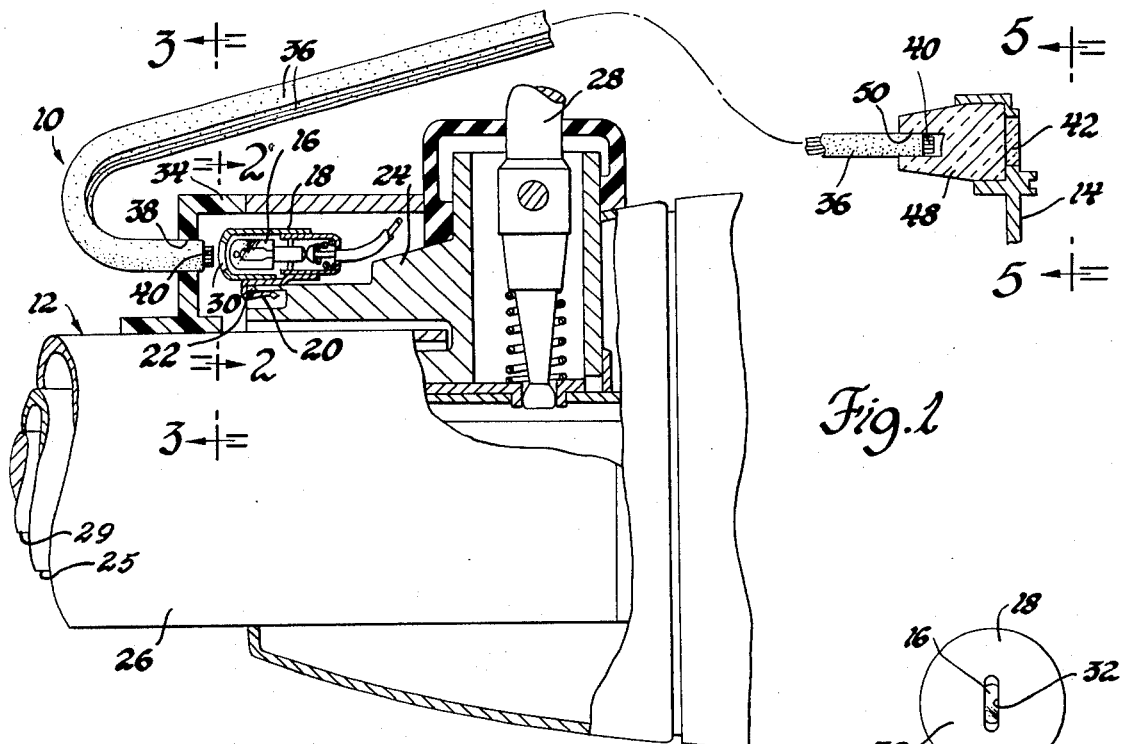
Fig.1
Fig.2
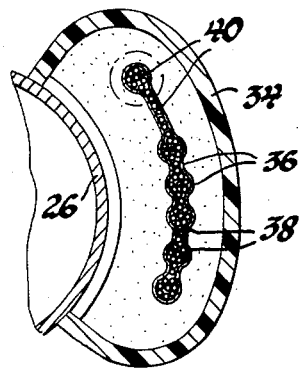
Fig.3
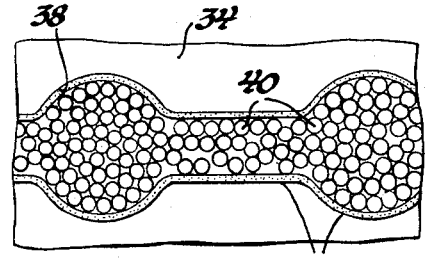
Fig.4
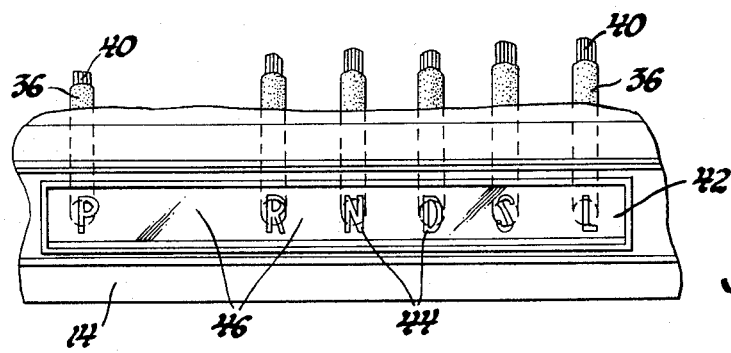
Fig.5

GEARSHIFT INDICATOR ARRANGEMENT

This invention relates generally to gearshift position indicators and, more particularly, to such indicators embodying fiber optic components.

Currently, gearshift indicator assemblies generally include spring-loaded cable-actuated pointer mechanisms. It is known that gearshift indicators employing fiber optics have recently been advocated, for example, see U.S. Pat. No. 3,643,622 which issued in the name of Edward Cryer on Feb. 22, 1972.

Accordingly, a general object of the invention is to provide an improved gearshift indicator arrangement embodying fiber optic indicator means.

Another object of the invention is to provide an improved gearshift indicator arrangement wherein a suitable light source is mounted on the selector lever-actuated shift bowl, with the speed ratio indicia being formed on a display dial mounted on the instrument panel, and having intercommunicating fiber optic bundles including predetermined numbers of fiber optic tubes which are progressively illuminated by the rotated light source so as to alternately illuminate the indicia and the spaces therebetween at different respective predetermined intensities.

Still another object of the invention is to provide an improved fiber optic-type gearshift indicator arrangement which may be utilized as a module suitable for being mounted on any of various makes and models of vehicles, simply by varying the lengths of the fiber optic tubes involved.

A further object of the invention is to provide a gearshift indicator arrangement including a light source mounted on the rotatable steering column shift bowl, a display dial mounted on the instrument panel and bearing conventional speed ratio indicia, a plurality of fixed fiber optic bundles extending from locations adjacent the light source to stations aligned respectively with the indicia and intermediate areas, with the bundles aligned with the indicia producing a higher intensity illumination than that of the bundles aligned with the intermediate areas, said indicia and intermediate areas being alternately illuminated at their respective intensities as the light source is manually rotated by a conventional selector lever past the adjacent fixed ends of the fiber optic bundles.

These and other objects and advantages of the invention will be apparent when reference is made to the following description and accompanying drawings, wherein:

FIG. 1 is a fragmentary cross-sectional view of a vehicular steering column and instrument panel embodying the invention;

FIG. 2 is a fragmentary cross-sectional view taken along the plane of line 2—2 of FIG. 1, and looking in the direction of the arrows;

FIG. 3 is a cross-sectional view taken along the plane of line 3—3 of FIG. 1, and looking in the direction of the arrows.

FIG. 4 is an enlarged fragmentary view of a portion of FIG. 3; and

FIG. 5 is a fragmentary cross-sectional view taken along the plane of line 5-5 of FIG. 1, and looking in the direction of the arrows.

Referring now to the drawings in greater detail, FIG. 1 illustrates a gearshift indicator mechanism 10 mounted in part on a steering column assembly 12 and in part on an instrument panel 14. The gearshift indicator mechanism 10 includes a light bulb 16 mounted in a tubular container 18 which, in turn, is secured by a spring-loaded tab 20 to an edge 22 of a conventional shift bowl 24, the latter being secured to a shift tube 25 which is concentrically rotatably mounted in the usual manner within a fixed steering column jacket 26. The shift tube 25 is concentrically mounted around a steering column 29 and is manually rotatable relative to the steering column, as well as to the steering column jacket 26 by a conventional selector lever 28. A partially-spherical closed end 30 is formed on the tubular container 18. A vertical slot 32 (FIG. 2) is formed in the center portion of the partially-spherical closed end 30.

An arcuate-shaped housing 34 (FIG. 3) is mounted on the steering column jacket 26. A plurality of arcuately aligned fiber optic bundles 36 are mounted at one end thereof through respective openings 38 formed in the housing 34. Each fiber optic bundle 36 includes a plurality of fiber optic tubes 40, there being different quantities of fiber optic tubes 40 in adjacent bundles 36, for a purpose to be explained. The bundles 36 may be formed as illustrated in FIG. 4, but may, of course, embody a different configuration in keeping with good manufacturing practices.

A transparent display dial 42 (FIG. 5), having the usual speed ratio indicia 44 formed thereon, such as "P," "R," "N," "D," "S," and "L," is mounted on the instrument panel 14. The indicia 44 are separated by predetermined spaces 46. A mounting or "plug-in" block 48 (FIG. 1) is secured to the engine side of the instrument panel 14 adjacent the indicia 44 and the intermediate spaces 46. A plurality of openings 50 are formed in the mounting block 48, each opening 50 being aligned with one of the indicia 44 or one of the spaces 46. The other ends of the bundles 36 are mounted in the respective openings 50.

In view of the alternately different quantities of tubes 40 in adjacent bundles 36, the intensity of the light transmitted therethrough and observable at the indicia 44 is a predetermined number of times greater than the intensity of the light observable throughout the spaces 46 intermediate adjacent indicia 44. For example, the fiber optic bundles aligned with the respective indicia 44 may contain, say, three times as many fiber optic tubes 40 in a given lateral distance as is the case for the budnles 36 which are aligned with the spaces 46 intermediate adjacent indicia 44. Hence, the intermediate spaces 46 serve as "tell-tale" zones enabling the vehicle operator to be aware at all times as to exactly where the selector lever 28 is selectively positioned relative to particular gearshift speed ratio selections being made.

In operation, it is apparent that, as the light bulb 16 and tubular container 18 are rotated with the shift bowl 24 by the selector lever 28, the light rays projecting through the vertical slot 32 will penetrate the adjacent open ends of those fiber optic tubes 40 which are, at any time, adjacent the vertical slot 32. As is well known, the light rays are thus transmitted through the full lengths of the fiber optic tubes 40, exiting from the respective other ends thereof at the instrument panel 14, as discussed above. The exiting light rays thus serve to illuminate the indicia 44 and spaces 46 therebetween at different intensities.

It should be apparent that the invention provides means for supplying modules suitable for mounting on different vehicular makes and models, once the light source 16/18, the housing 34, and the mounting block 48 are standardized, with the lengths only of the fiber optic tubes 40 having to be varied.

It should also be apparent that the invention provides an improved arrangement for utilizing light means, in lieu of cables, springs, and pointers, for illuminating selected speed ratio indicia, while additionally providing means for illuminating the spaces between such indicia in order to be continually aware of exact location of the selector lever.

While but one embodiment of the invention has been shown and described, other modifications thereof are possible.

I claim:

1. A vehicular gearshift indicator arrangement comprising a rotatable shift bowl-mounted light source, means for concentrating the light rays from said light source, a stationary housing having an open side thereof positioned adjacent said means, a plurality of arcuately aligned openings formed in a wall of said stationary housing opposite said open side, a plurality of fiber optic bundles, each of said bundles including a plurality of fiber optic tubes and each bundle being secured adjacent one end thereof in one of said arcuately aligned openings, an instrument panel-mounted transparent display dial, a plurality of spaced indicia formed on said display dial, there being predetermined lengths of spaces intermediate adjacent indicia, an instrument panel-mounted mounting block secured adjacent said indicia and said intermediate spaces, and a plurality of openings formed in said mounting block aligned respectively with said indicia and with said intermediate spaces, said plurality of fiber optic bundles being secured at their other ends in said plurality of openings, said bundles aligned with said indicia including a predetermined quantity of said fiber optic tubes while said bundles aligned with said intermediate spaces include a quantity of said fiber optic tubes less than said predetermined quantity such that the illumination of said intermediate spaces is at a lesser intensity than that of said indicia upon selected rotation of said shift bowl-mounted light source.

2. A vehicular gearshift indicator arrangement comprising a rotatable shift bowl-mounted light source including a tubular housing, a light bulb mounted in said tubular housing, and a slotted opening formed in one end of said tubular housing; a stationary housing having an open side thereof positioned adjacent said slotted opening; a plurality of arcuately aligned openings formed in a wall of said stationary housing opposite said open siad; a plurality of fiber optic bundles, each of said bundles including a plurality of fiber optic tubes and each bundle being secured adjacent one end thereof in one of said arcuately aligned openings; an instrument panel-mounted transparent display dial; a plurality of spaced indicia formed on said display dial, there being predetermined lengths of spaces intermediate adjacent indicia; and instrument panel-mounted mounting block secured adjacent said indicia and said intermediate spaces; and a plurality of openings formed in said mounting block aligned respectively with said indicia and with said intermediate spaces, said plurality of fiber optic bundles being secured at their other ends in said plurality of openings, said bundles aligned with said indicia including a predetermined quantity of said fiber optic tubes while said bundles aligned with said intermediate spaces include a quantity of said fiber optic tubes less than said predetermined quantity such that the illumination of said intermediate spaces is at a lesser intensity than that of said indicia upon selected rotation of said shift bowl-mounted light source.

3. A vehicular gearshift indicator arrangement suitable for being mounted on a steering column jacket, a shift bowl rotatable relative to said steering column jacket, and an instrument panel including a transparent display dial having indicia formed in a predetermined spaced relationship thereon, said gearshift indicator arrangement comprising a light source adapted for mounting on said rotatable shift bowl, means for concentrating the light rays from said light source, a housing adapted for mounting on said steering column jacket and having an open side thereof positioned adjacent said means, a plurality of arcuately aligned openings formed in a wall of said housing opposite said open side, a plurality of fiber optic bundles, each of said bundles including a plurality of fiber optic tubes and each bundle being secured adjacent one end thereof in one of said arcuately aligned openings, a mounting block adapted for mounting on or adjacent said instrument panel adjacent said spaced indicia, and a plurality of openings formed in said mounting block aligned respectively with said indicia and the spaces therebetween, said plurality of fiber optic bundles being secured at their other ends in said plurality of openings, said bundles aligned with said indicia including a predetermined quantity of said fiber optic tubes while said bundles aligned with said intermediate spaces include a quantity of said fiber optic tubes less than said predetermined quantity such that the illumination of said intermediate spaces is at a lesser intensity than that of said indicia upon selected rotation of said shift bowl.

4. A vehicular gearshift indicator arrangement suitable for being mounted on a steering column jacket, a shift bowl rotatable relative to said steering column jacket, and an instrument panel including a transparent display dial having indicia formed in a predetermined spaced relationship thereon, said gearshift indicator arrangement comprising a light source adapted for mounting on said shift bowl, said light source including a tubular housing, a light bulb mounted in said tubular housing, and a slotted opening formed in one end of said tubular housing; a housing adapted for mounting on said steering column jacket and having an open side thereof positioned adjacent said slotted opening; a plurality of arcuately aligned openings formed in a wall of said housing opposite said open side; a plurality of fiber optic bundles, each of said bundles including a plurality of fiber optic tubes and each bundle being secured adjacent one end thereof in one of said arcuate aligned openings; a mounting block adapted for mounting on or adjacent said instrument panel adjacent said spaced indicia; and a plurality of openings formed in said mounting block aligned respectively with said indicia and with the spaces therebetween, said plurality of fiber optic bundles being secured at their other ends in said plurality of openings, said bundles aligned with said indicia including a predetermined quantity of said fiber optic tubes while said bundles aligned with said intermediate spaces include a quantity of said fiber optic tubes less than said predetermined quantity such that the illumination of said intermediate spaces is at a lesser intensity than that of said indicia upon selected rotation of said shift bowl.

5. A vehicular gearshift indicator arrangement comprising a fixed steering column jacket, a shift bowl operatively connected to said steering column jacket and rotatable relative thereto, an instrument panel, a tubular housing mounted on said rotatable shift bowl, a light bulb mounted in said tubular housing, a slotted opening formed in one end of said tubular housing, a housing mounted on said steering column jacket and having an open side thereof positioned adjacent said slotted opening, a plurality of arcuately aligned openings formed in a wall of said housing opposite said open side, a plurality of fiber optic bundles, each of said bundles including a plurality of fiber optic tubes and each bundle being secured adjacent one end thereof in one of said arcuately aligned openings, a transparent display dial mounted on said instrument panel, a plurality of spaced indicia formed on said display dial, there being predetermined lengths of spaces intermediate adjacent indicia, a mounting block operatively connected to said instrument panel adjacent said indicia and said intermediate spaces, and a plurality of openings formed in said mounting block aligned respectively with said indicia and with said intermediate spaces, said plurality of fiber optic bundles being secured at their other ends in said plurality of openings, said bundles aligned with said indicia including a predetermined quantity of said fiber optic tubes while said bundles aligned with said intermediate spaces include a quantity of said fiber optic tubes less than said predetermined quantity such that the illumination of said intermediate spaces is at a lesser intensity than that of said indicia as said light bulb and slotted housing are rotated past said adjacent ends of said fiber optic tubes.

* * * * *